United States Patent [19]

Insam

[11] 3,794,095
[45] Feb. 26, 1974

[54] TIRE CHAIN WITH CLEATS

[75] Inventor: Theodor Insam, Kitzbuhel, Austria

[73] Assignee: Reid-Kettenfabrik Rieger & Dietz, Wurtemberg, Germany

[22] Filed: Jan. 24, 1972

[21] Appl. No.: 219,990

[30] Foreign Application Priority Data
Jan. 25, 1971 Austria.................................... 567

[52] U.S. Cl. .............................................. 152/239
[51] Int. Cl. ........................................... B60c 27/04
[58] Field of Search.................... 152/239, 223, 224

[56] References Cited
UNITED STATES PATENTS

| | | | |
|---|---|---|---|
| 2,259,189 | 10/1941 | William et al. .................... | 152/224 |
| 2,244,218 | 6/1941 | Rollings............................. | 152/224 |
| 1,952,944 | 3/1934 | Ruffertshofer..................... | 152/223 |

Primary Examiner—James B. Marbert
Attorney, Agent, or Firm—Karl F. Ross; Herbert Dubno

[57] ABSTRACT

Certain links of a tire chain are inserted into and/or interconnected by cleats in the form of flat or annular bodies provided along one edge with a plurality of indentations gripping parts of the same or different chain links. The cleat bodies extend generally transversely to the main direction of the engaged chain to increase the traction exerted by the tire carrying the chain.

10 Claims, 11 Drawing Figures

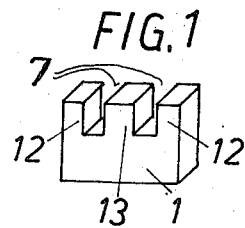
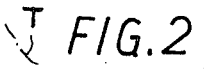
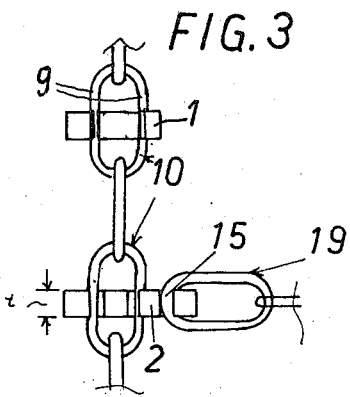
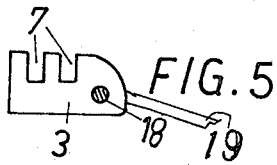
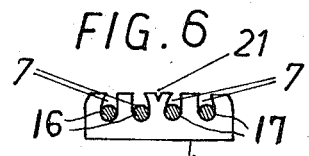
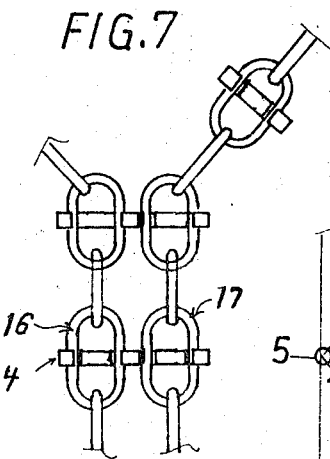
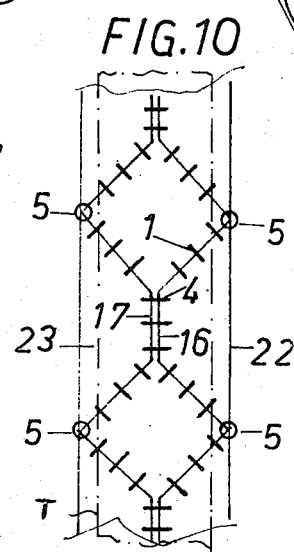
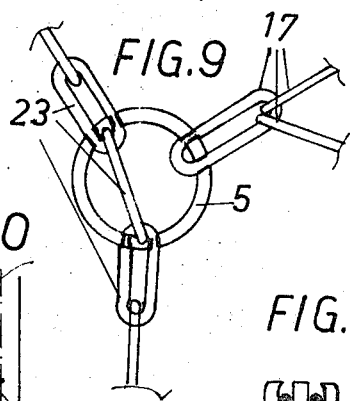
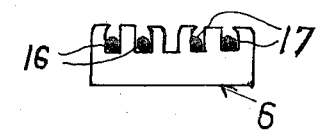

TIRE CHAIN WITH CLEATS

My present invention relates to a tire chain to be fitted onto a traction element of an automotive vehicle for driving in snow or slush.

In order to enhance the traction-increasing effect of such chains, the latter can be provided with wire coils, disks or similar attachments which generally must be fitted thereon during manufacture and which do not always maintain an optimum attitude with reference to the direction of locomotion. In some instances, these attachments tend to slide along the wire forming the chain links with a resulting tendency to reduce rather than increase the traction.

The general object of my invention, therefore, is to provide an improved tire chain with conventional links having traction-increasing means which avoid the aforestated disadvantages and can be emplaced on (or detached from) these links in a simple manner at any time.

A more particular object is to provide traction-increasing means which can also be used as coupling elements for the links of different chain branches.

These objects are realized, pursuant to the present invention, by the provision of cleats engaging certain of the chain links, each cleat having a body with a crenellated edge generally transverse to the direction of locomotion forming a plurality of juxtaposed indentations which positively engage respective portions of the wire loops forming the chain links.

The positive engagement of a cleat with an associated link or links may be brought about by deforming the ends of the teeth defining the crenellations, as by bending or upsetting them, thereby locking the loops in position. The number of indentations or notches may vary in dependence upon the number of links to be gripped thereby, a minimum of two indentations being required to ensure the proper orientation of a link in a longitudinal chain branch with its loop parallel to the road surface which may be contacted by the cleat either with its crenellated edge or with a parallel opposite edge. It is also possible to close the initially open ends of the indentations or notches by means of individual plugs or a retaining strip overlying substantially the entire crenellated edge; in the latter instance, not only the width but also the depth of each notch may be made substantially equal to the wire diameter.

The cleats may be made from suitably case-hardened or annealed metal (e.g. steel) or from hard synthetic resin, preferably of the glass-fiber-reinforced type. Soft rubber or other elastomeric material, with or without hard-metal cores, could also be used in some instances, especially if the notches are firmly plugged or sealed by retaining means adhesively secured thereto.

The cleat body may be flat and, in such a case, advantageously has a thickness less than the spacing of the parallel loop portions of a link so that one of its notches may receive the bight portion of a link loop at the end of a transverse chain branch to be joined to a longitudinal branch engaged by the same cleat. Some of the cleats, however, may also have annular shape in order to be used as a junction from which three or more chain branches extend at various angles.

The above and other features of my invention will be described in detail hereinafter with reference to the accompanying drawing in which:

FIG. 1 is a perspective view of a cleat embodying my invention;

FIG. 2 is a side-elevational view of the cleat shown in FIG. 1;

FIG. 3 is a plan view of part of a tire chain provided with cleats according to the invention;

FIG. 4 is a view similar to FIG. 2, illustrating a modified cleat also seen in FIG. 3;

FIGS. 5 and 6 are elevational views of cleats embodying further modifications;

FIG. 7 is a view similar to FIG. 3 but showing part of a chain structure incorporating cleats of the type illustrated in FIG. 6;

FIG. 8 is an elevational view of a cleat generally similar to that of FIG. 6;

FIG. 9 is a further plan view showing still another type of cleat according to the invention in combination with part of a chain structure;

FIG. 10 is a plan view of part of a composite chain with cleats of the type shown in FIGS. 6 and 9; and FIG. 11 is an elevational view of a cleat provided with retaining means.

In FIGS. 1 and 2 I have shown a cleat 1 in the form of a flat body of rectangular outline with a crenellated edge along one major side defined by teeth 12, 13 and intervening indentations 7. These indentations are designed to receive a pair of parallel legs 9 of a planar wire link 10 (FIG. 3) forming part of a tire chain. Another such link engages in the notches of a similar cleat 2, also shown in FIG. 4, which has three notches 7 and forms the junction between two chain branches. Thus, links 10 are part of a longitudinal chain branch or stringer extending in the direction of locomotion whereas a link 19, having a bight portion 15 received in the right-hand notch of cleat 2, is the terminal of a transverse branch interconnecting two such stringers. It will be noted that the thickness $t$ of the link 2 is less than the spacing of the legs of link 19 which has the same shape as the links 10.

As illustrated in FIG. 2, the wire 9 fits closely into the notches and is locked in position by the inbending (or possibly upsetting and broadening) of the free ends of the outer teeth 12 bounding these notches. The height $h'$ of the teeth somewhat exceeds the diameter $d$ of wire 9 and is roughly equal to the height $h''$ of the solid portion of body 1 whose lower edge contacts the roadway while the crenellated upper edge bears upon the sole of a tire whose profile has been partly indicated at T. Height $h''$ may approximately equal half the width of the wire loop as measured across legs 9. This height $h''$ may, however, vary according to conditions of use, depending on whether the cleats also have a supporting function (with the stringers directly underneath the tire sole) or are merely ancillary traction elements. Naturally, the shape and spacing of the deformed tooth ends and their height above the chain links should be so chosen as to avoid possible damage to the tire. Furthermore, the cleats may be relatively inverted with their solid edges contacting the tire and their crenellated edges engaging the road; in such case their teeth may be of different length, e.g. with a middle tooth extended to form a spike.

In the arrangement of FIG. 3 every other link 10 of a longitudinal chain branch or stringer is provided with its own cleat. If desired, however, the cleats could follow one another at longer intervals.

FIG. 5 shows a cleat 3 in which a hole 18, laterally offset from the notches 7, serves as a permanent anchorage for a transverse link 19.

FIG. 6 illustrates a cleat 4 with four notches 7, after deformation of the adjacent teeth to hold in position two links 16, 17 of a pair of parallel stringers as shown in FIG. 7. The middle tooth is split at 21 so as to be deformable in two directions to lock in the adjoining loop portion.

In FIG. 8 I have depicted a cleat 6 which can be used for the same purpose as the cleat 4 of FIG. 6 and is provided with four active notches and an unused central notch designed to facilitate the deformation of the adjoining teeth.

As seen in FIG. 11, a cleat 5 with two notches (accommodating a link 17) is provided with a retaining strip 24 which overlies its crenellated edge and is permanently secured thereto, e.g. by spot welding, at points 25. Such a strip could, of course, be used with any of the cleat formations shown in preceding Figures.

FIG. 10 is a view of a larger section of a tire chain including stringers 22 and 23 as well as connecting branches formed by sets of links 16 and 17, the junctions therebetween being constituted by annular cleats more fully illustrated in FIG. 9. As shown in the latter Figure, two horizontal links of stringer 23 are held in respective pairs of notches of the crenellated upper edge of a ring 5 whose diameter is slightly larger than a link length so that the intervening vertical link of the stringer can be accommodated therein. A horizontal link of the adjoining branch 17 engages in a third pair of notches on the crenellated ring edge. This ring need not be circular, as shown, but could also be polygonal (e.g. triangular or square) according to the chain configuration and the mechanical requirements.

In the arrangement of FIG. 10, where the outline of the tire has again been indicated at T, the stringers 22 and 23 may lie along the lateral tire walls whereas the link series 16 and 17 form rhombic or diamond-shaped patterns at the traction surface. Thus, it is only these latter chain branches that need to be equipped with transverse cleats, such as two-notch cleats 1 in the region of the diamonds and four-notch cleats 4 on the intervening stretches where the branches 16 and 17 run alongside each other. The cleats and chain links have been indicated only diagrammatically in FIG. 10.

Since the crenellated edge portion of ring 5 also extends generally transversely to a series of links (such as the stringer 23) connected therewith, annular cleats of this nature have a traction-increasing effect comparable to that of the flat cleats 1 – 4.

It will thus be seen that I have provided an improved tire chain whose cleats can be rapidly mass produced by conventional techniques and with the help of unskilled or semiskilled labor, these cleats being easily fitted on any prefabricated chain with looped wire links and being just as easily removed therefrom (except for the modification of FIG. 11) for replacement in the case of damage. Some of the notches, such as those receiving the link 19 in FIG. 3 or the link 17 in FIG. 9, could also be disposed on the opposite edge of the cleat body.

As will be apparent from the drawing, the link loops of each chain branch 16, 17 lie alternately in mutually orthogonal planes, the plane of any cleat-engaging link 10, 17, 19, 23 being parallel to the surface of tire T.

I claim:

1. A tire chain comprising at least one series of elongate closed-loop planar links lying alternately in mutually orthogonal planes and extending generally in the direction of locomotion upon a mounting of the chain on a vehicular tire, and a set of cleats engaging certain of said links, each of said cleats having a body with a crenellated edge generally transverse to said direction forming at least two juxtaposed indentations individually receiving a pair of parallel loop portions of at least one of said links lying in a plane parallel to the tire surface.

2. A chain as defined in claim 1 wherein said indentations are separated by teeth integral with said body with deformed ends overlying the engaged loop portions.

3. A chain as defined in claim 2 wherein said body is provided with retaining means along said edge overlying the engaged loop portions.

4. A chain as defined in claim 1 wherein said body is provided with a hole laterally offset from said indentations and traversed by a further chain link.

5. A chain as defined in claim 1 wherein said chain is divided into several branches, some of said cleats being disposed at junctions of said branches in engagement with respective links from different branches.

6. A chain as defined in claim 5 wherein said some of said cleats are annular.

7. A chain as defined in claim 1 wherein said body is flat and perpendicular to said one of said links.

8. A chain as defined in claim 7 wherein said chain has a transverse branch with a link engaged in a further indentation of said body.

9. A chain as defined in claim 7 wherein said body has a solid part underlying said indentations and with a road-engaging edge paralleling said crenellated edge.

10. A chain as defined in claim 7 wherein said body has a thickness less than the spacing of said parallel loop portions.

* * * * *

UNITED STATES PATENT OFFICE
CERTIFICATE OF CORRECTION

Patent No. 3,794,095        Dated 26 February 1974

Inventor(s) Theodor INSAM

It is certified that error appears in the above-identified patent and that said Letters Patent are hereby corrected as shown below:

In the heading, line [73], for the assignee's name "REID-KETTENFABRIK RIEGER & DIETZ" read -- RUD-KETTENFABRIK RIEGER & DIETZ -- .

Signed and sealed this 1st day of October 1974.

(SEAL)
Attest:

McCOY M. GIBSON JR.
Attesting Officer

C. MARSHALL DANN
Commissioner of Patents